UNITED STATES PATENT OFFICE.

GEORGE M. LITTLE, OF PITTSBURGH, PENNSYLVANIA, ASSIGNOR TO WESTINGHOUSE ELECTRIC AND MANUFACTURING COMPANY, A CORPORATION OF PENNSYLVANIA.

ARC-LAMP ELECTRODE.

1,159,511.  Specification of Letters Patent.  Patented Nov. 9, 1915.

No Drawing.  Application filed March 3, 1914.  Serial No. 822,156.

*To all whom it may concern:*

Be it known that I, GEORGE M. LITTLE, a citizen of the United States, and a resident of Pittsburgh, in the county of Allegheny and State of Pennsylvania, have invented a new and useful Improvement in Arc-Lamp Electrodes, of which the following is a specification.

My invention relates to arc lighting and particularly to electrodes containing some form of titanium which will give luminous and highly efficient arcs.

Heretofore, electrodes have been made of titanium compounds associated with either carbon or magnetite. Electrodes in common use contain titanium oxid which insures luminous arcs that radiate large quantities of light flux. Iron oxid or magnetite is added to assist in steadying the arcs and to increase the conductivity of the electrodes by reason of its metallic characteristics. Other materials, as chromic oxid, boric acid, etc. are also embodied in electrode compositions in order to steady the arcs, make the slag more infusible, and impart certain color values to the light emitted from arcs. While high efficiency of the electrodes results largely from the luminosity of the titanium in the arc, the iron which enters into the arc, as the electrodes consume, also gives luminosity to the same, the arc spectrum showing the predominance of titanium and iron lines. Inasmuch as the greater quantity of the light results from the projection of the titanium and iron material into the arc, a more efficient arc may be produced if the volatilization of the titanium and the iron material is hastened or accelerated.

By means of my invention, I propose to add a chemical compound to an arc lighting electrode comprising titanium material or titanium and iron, which will aid in producing a more efficient arc than those heretofore produced.

When employing a metallic oxid, such as iron oxid or magnetite, I prefer to use titanium oxid ($TiO_2$) for imparting the luminous characteristic to the arc. I find that titanium oxid is very stable in combination with iron oxid, and produces a highly efficient arc. By the addition of tungstic oxid ($WO_3$), the efficiency of the arc is greatly increased. For instance, by means of photometric measurements, it may be determined that arcs formed by electrodes comprising titanium, iron and tungsten material, emit larger quantities of light flux than those arcs produced by electrodes comprising similar quantities of titanium and iron materials, but containing no tungsten material. While the chemical action resulting from the addition of tungsten material appears to be complex and is not thoroughly understood, I find, nevertheless, than the efficiency of the arc formed by an electrode comprising titanium material and tungstic oxid, is greatly increased.

I have made an excellent electrode in accordance with my invention by using the following constituents in the proportions stated: Ferric oxid or magnetite ($Fe_3O_4$), 60 parts; titanium oxid ($TiO_2$), 35 parts; chromic oxid ($Cr_2O_3$), 4.5 parts; boric acid ($H_3BO_3$), 6 parts; sodium fluorid (NaF), 1 part, and tungsten oxid ($WO_3$), 5 parts.

While I have given the proportions of the constituents suitable for making an electrode, it will be understood that these proportions may be materially varied without departing from my invention. I have found, for instance, that, by the addition of one part of tungstic oxid, the light flux emitted from the arc is materially increased. Of course, as the tungsten oxid tends to make the titanium oxid and other materials volatilize more rapidly, the life of the electrode is decreased, and, for this reason, the amount of tungstic oxid to be added to the electrode is determined by the number of hours that it is desired to burn the electrode and by the brilliancy demanded of the arc.

As hereinbefore mentioned, the iron oxid or magnetite is added to increase the conductivity of the electrode and the slag, and the stability of the arc. It also imparts a small amount of luminosity to the arc. However, the larger portion of the light emitted from the arc results from the luminosity imparted thereto by the titanium oxid. By means of adding an alkaline metal fluorid, an alkaline earth fluorid, or an earth metal fluorid, as sodium fluorid, the conductivity of the arc is increased, thereby lending stability to the arc and insuring a light of more uniform intensity and color. In manufacturing these electrodes, the addition of boric acid causes the particles comprising the finished electrode to adhere more closely together. At the same time, it adds mechanical rigidity to the "green" electrodes, whereby they may be handled with greater facility during the manufacturing operations. In a slight degree, boric acid acts in the same manner as tungstic oxid, but its effectiveness in causing a more rapid volatilization of the materials contained in the electrode is not as pronounced as that obtained by adding tungstic oxid. The combination, in an electrode, of sodium fluorid and boric acid in amounts over two per cent. assists in preventing the formation of a slag which acts as an insulator, when cold.

If it is desired to manufacture the electrodes by forcing them through dies, a binder comprising starch, glucose and oil or glycerin is added which acts only as a temporary binder that substantially disappears during the subsequent baking and oxidizing operations.

It will be understood that I do not limit my invention to any specific amount of tungstic oxid, the amount being dependent upon the desired life of the electrodes and the brilliancy of the emitted light.

I claim as my invention:

1. An arc light electrode containing titanium oxid and tungsten material.
2. An arc light electrode containing titanium oxid and tungstic oxid.
3. An arc light electrode containing a metallic oxid, titanium material and tungsten material.
4. An arc light electrode containing a metallic oxid, titanium oxid, and a tungsten material.
5. An arc light electrode containing a metallic oxid, titanium oxid and tungstic oxid.
6. An arc light electrode of metallic composition and containing titanium oxid and tungstic oxid.
7. An arc light electrode composed principally of a mixture of titanium oxid with a metallic substance having greater electric conductivity than said oxid, and tungstic oxid which effects a more rapid volatilization of the titanium oxid in the arc.
8. A metallic arc light electrode containing titanium oxid and tungstic oxid.
9. An arc light electrode containing oxids of iron, titanium and tungsten.
10. An arc light electrode containing oxids of iron, titanium, tungsten, and an alkaline metal fluorid.
11. An arc light electrode containing oxids of iron, titanium, tungsten, and sodium fluorid.
12. An arc light electrode containing oxids of iron, titanium, tungsten, sodium fluorid and boric acid.
13. An arc light electrode containing oxids of iron, titanium, tungsten, sodium fluorid, boric acid and chromic oxid.

In testimony whereof, I have hereunto subscribed my name this 25th day of Feb., 1914.

GEORGE M. LITTLE.

Witnesses:
B. B. HINES,
M. C. MERZ.